United States Patent [19]

Hambright et al.

[11] Patent Number: 4,944,219

[45] Date of Patent: Jul. 31, 1990

[54] TORSION LEVERAGE NUTCRACKER

[76] Inventors: John W. Hambright, 1212 Chaparral, DeSoto, Tex. 75115; Jerry S. Hambright, Rte. 1, Box 344, Hawkins, Tex. 75765

[21] Appl. No.: 282,592

[22] Filed: Dec. 12, 1988

[51] Int. Cl.⁵ .......................... A23N 5/00; A47J 43/26
[52] U.S. Cl. .......................................... 99/581; 99/568
[58] Field of Search ................ 99/581, 582, 551, 574, 99/575, 579, 580, 583, 577, 578, 568, 572; 68/21, 94, 243

[56] References Cited

U.S. PATENT DOCUMENTS

| | | | |
|---|---|---|---|
| 234,577 | 12/1880 | Huffman | 68/243 |
| 404,016 | 10/1889 | Quackenbush | 99/581 |
| 1,188,373 | 8/1916 | Ross | 68/243 |
| 2,031,189 | 2/1936 | Stromberg | 99/579 |
| 3,040,655 | 6/1962 | Byars | 68/243 |
| 3,965,810 | 6/1976 | Miller | 99/581 |
| 4,182,226 | 1/1980 | Sigas | 99/581 |

Primary Examiner—Timothy F. Simone
Attorney, Agent, or Firm—Daniel V. Thompson

[57] ABSTRACT

A nutcracker includes upper and lower endplates and a plurality of rod members loosely interfitted with apertures in the endplates. Adjacent ones of the rod members interfitted to one of the endplates are widely spaced to admit nuts into a nut envelope defined by the rod members. Relative rotation of the endplates enables the cracking of the nut within the nut envelope.

17 Claims, 3 Drawing Sheets

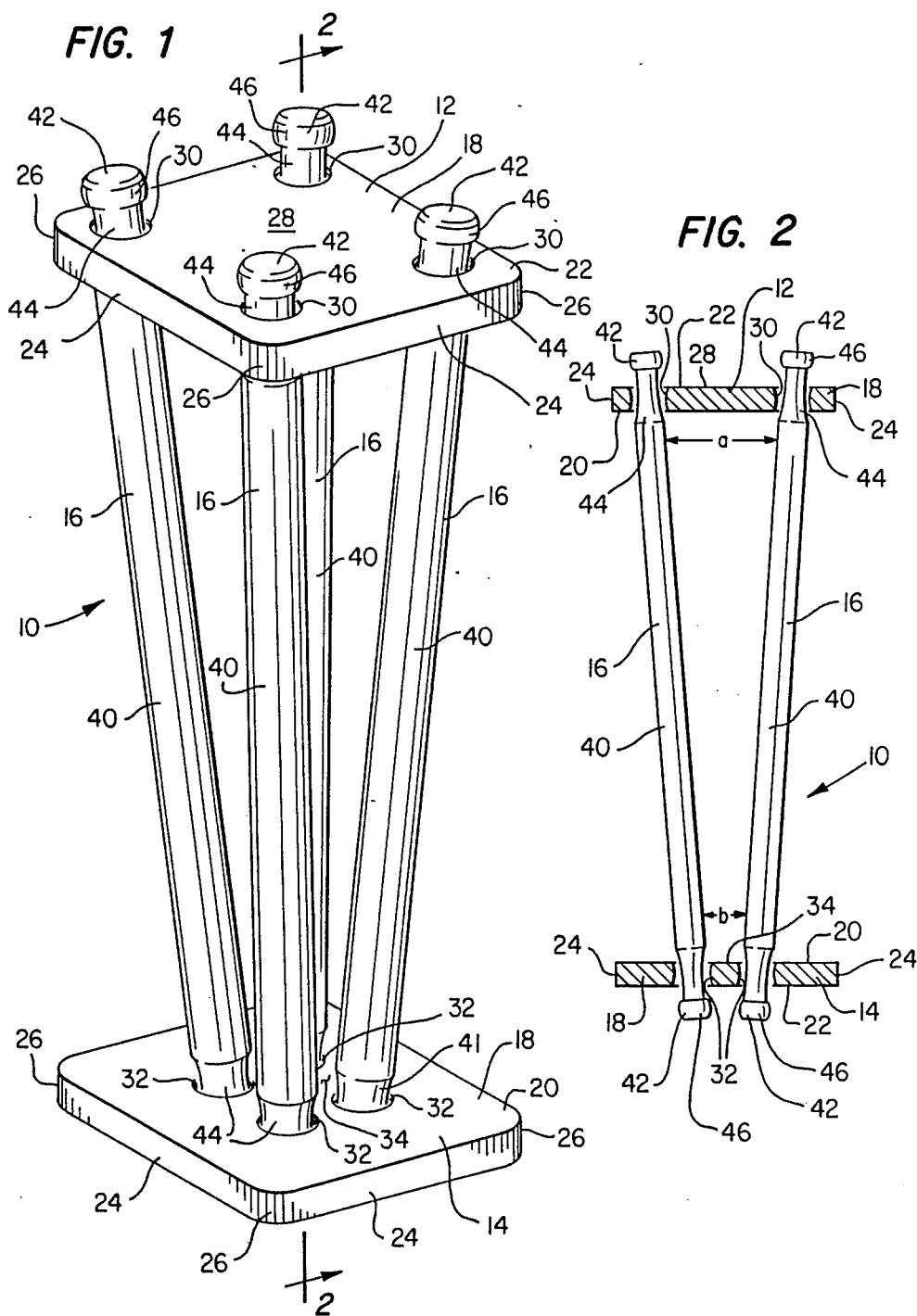

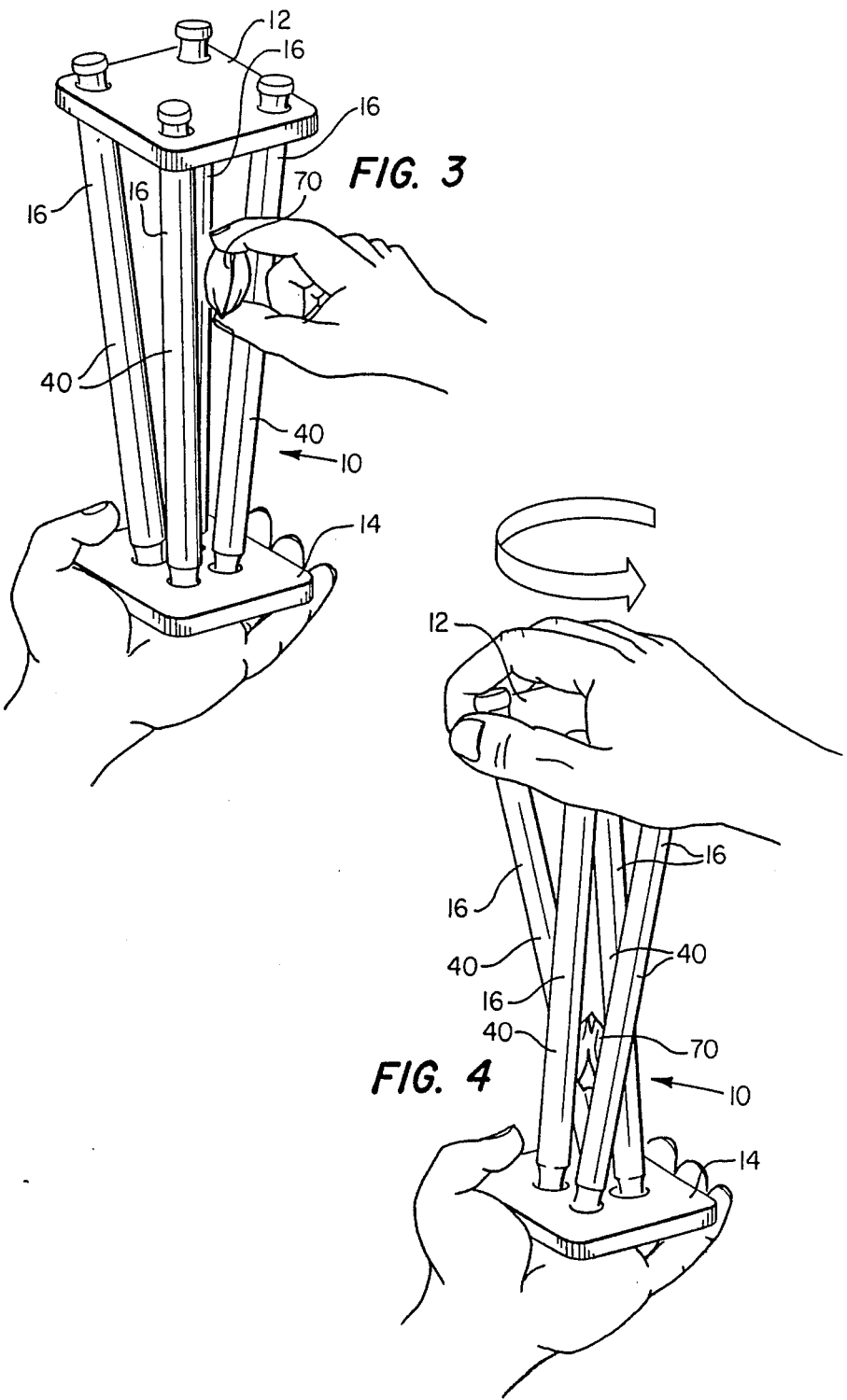

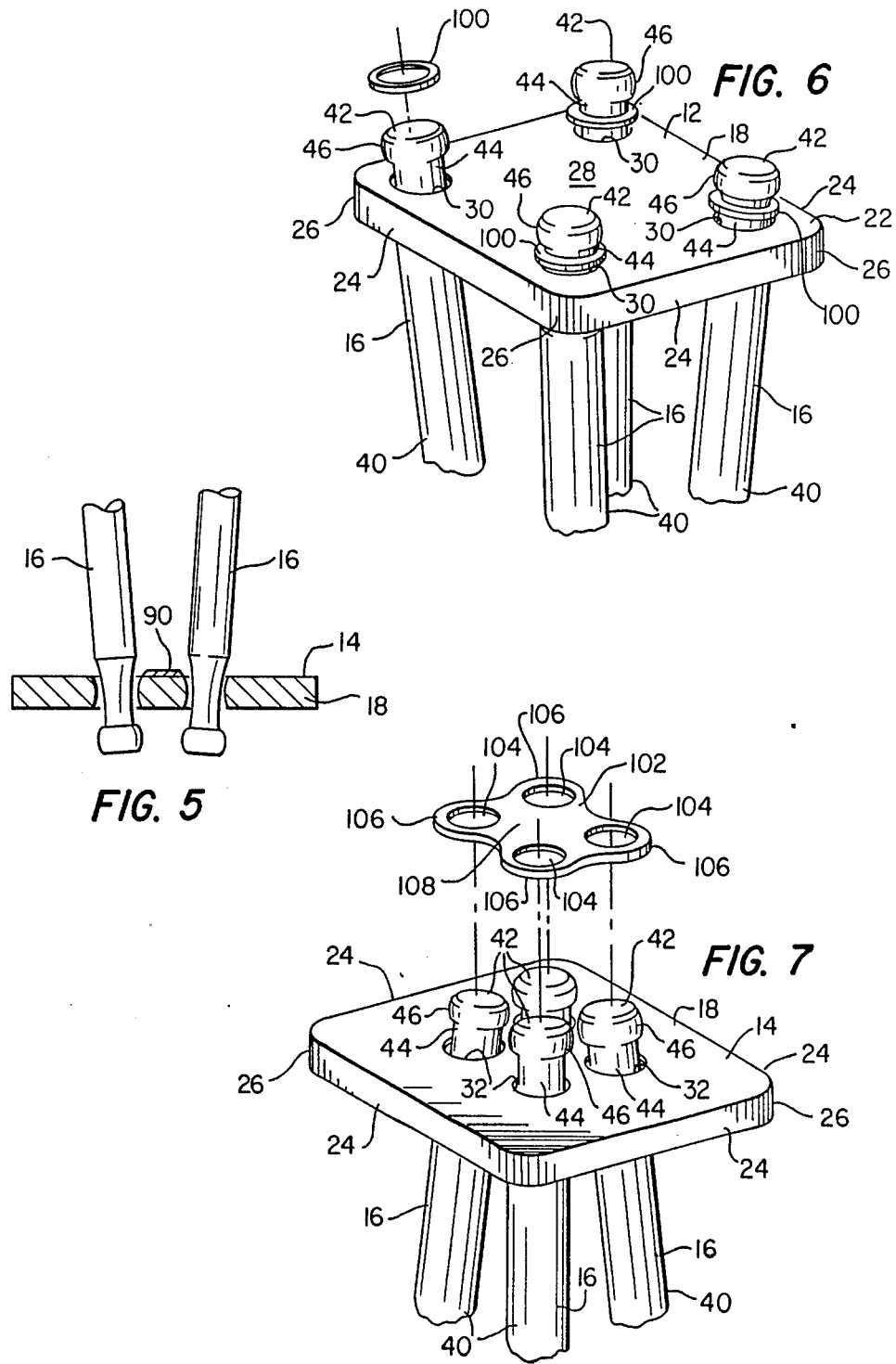

TORSION LEVERAGE NUTCRACKER

TECHNICAL FIELD

This pertains to cracking shells of different edible nuts, pecans of all sizes, walnuts, almonds and even Brazil nuts, and more specifically to nutcrackers found in the home.

BACKGROUND OF THE INVENTION

The familiar nutcrackers found in the home have numerous drawbacks and disadvantages. The screw type nutcracker when worn or not carefully built tends to crack some nuts in such a way that the shell is not sufficiently cracked or too much of the meat is crushed. It is difficult to crack some of the more brittle shells with the dual lever type cracker without severely damaging the meat of the nut and is very messy when both hands are required to crack the shells. The inertia cracker does a great job when it is in the hands of an experienced person, but it is difficult to keep shells from flying everywhere.

The Miller Pat. No. 3,965,810, issued June 29, 1976, discloses a torsion leverage nutcracker which requires an opening in one of the handles through which the nut is dropped, rather than wide spacing of the rods through which a nut is inserted. In addition, the Miller nutcracker discloses a complicated construction using eight rods, but does not disclose a simple construction which utilizes the compressibility of wood to enable ease of assembly.

SUMMARY OF THE INVENTION

This invention provides a nutcracker having four cracking rod members retained between upper and lower endplates in such a way that the center line of the rod members forms a long conical nut envelope with the rod members forming the larger end of the envelope so spaced to receive the nuts between the rod members and the upper endplate. The lower endplate retains the rod members at the smaller end of the nut envelope with the rod members so retained between the endplates to allow the turning of the endplates relative to one another so that the outer surface of the imaginary conical nut envelope is compressed, reducing the center distances between the rod members with the greatest reduction midway between the endplates, providing the inward force acting on the nut to crack its shell. In preferred form, the endplates and rod members are formed of a compressible material, preferably wood, with the ends of the rod members interfitted into precision formed apertures in the end plates to enable a press fittable assembly and resilient elements are provided to maintain the interfitted relationship between the rod members and endplates.

BRIEF DESCRIPTION OF THE DRAWINGS

A more complete understanding of the invention and its advantages will be apparent from the Detailed Description taken in conjunction with the accompanying Drawings in which:

FIG. 1 is a perspective view of a nutcracker constructed in accordance with the invention;

FIG. 2 is a sectional view taken along lines 2—2 of FIG. 1;

FIGS. 3 and 4 are perspective views illustrating the operation of the invention;

FIG. 5 is a partially broken away side view illustrating a wear pin for use with the invention; and FIGS. 6 and 7 are partial perspective views illustrating resilient elements for use with the invention.

DETAILED DESCRIPTION

Referring initially to FIGS. 1 and 2, nutcracker 10 includes upper endplate 12, lower endplate 14 and four identical rod members 16. Each of the upper and lower endplates 12 and 14 includes a rectangular plate member 18 of substantially identical outer dimension. Plate members 18 include parallel planar inner and outer surfaces 20 and 22, respectively. Each plate member 18 also includes four side surfaces 24 of substantially equal length and being parallel on opposite sides and perpendicular on adjacent sides, such that the plate members 18 have substantially square horizontal cross-sections. Preferably, the corners of the plate members are rounded, as at reference numeral 26 in FIG. 1. Upper endplate 12 has an aperture-free central portion 28. Upper endplate 12 also includes walls defining four apertures 30 being widely spaced and in close proximity to the four corners thereof. In contrast, lower endplate 14 has walls defining four apertures 32 closely spaced in central portion 34 thereof.

The four identical elongated rod members 16 each includes a cylindrical main portion 40 and two end portions 42. End portions 42 are defined by a tapered inner end portion 44 and a semi-spherical outer end portion 46. Outer end portions 46 are of smaller outer dimension than the main portions 40, but are of larger outer dimension than the adjoining inner end portions 44. Thus, when assembled as shown in FIGS. 1 and 2, the rod members 16 are loosely retained by apertures 30 and 32 to enable the relative rotation of endplates 12 and 14.

As best shown in FIG. 2, adjacent ones of the rod members 16 are widely spaced apart at the ends thereof interfitted to upper endplate 12, whereas adjacent ones of the rod members 16 are closely spaced at the ends interfitted to lower endplate 14. Preferably, dimension a, which is defined as the space between adjacent ones of rod member 16 in the vicinity of the upper endplate, is in the range of about 1.25 inches to about 1.75 inches to enable admission of nuts having dimensions of the typical pecan, walnut or Brazil nut. The rod members 16 define a tapered nut envelope which becomes smaller in the downward direction, such that nuts admitted into the nut envelope drop by gravity into contact engagement with rod members 16 at a lower position. Preferably, dimension b, which is defined as the spacing between rod members 16 in the vicinity of ends interfitted with the lower end plate 14, is in the range of about 0.25 inch to about 0.5 inch. The overall length of rod members 16 is preferably about 9 inches, and the preferred combination of dimensions a, b and rod length enable utilization of the nutcracker with substantially all types of nuts typically encountered in home use.

In operation, as shown in FIGS. 3 and 4, a nut 70 is admitted between the rod members 16 at a position above the point where the spacing of rod members 16 is greater than the smallest outer dimension of the nut 70. Nut 70 then drops by gravity into contact engagement with the main portions 40 of rod members 16. Relative rotation of endplates 12 and 14, as shown in FIG. 4, causes the nut envelope defined by rod members 16 to compress, thereby applying cracking forces to nut 70. Relative rotation and the resulting cracking forces are slowly increased until such time as the nut shell is sufficiently cracked to enable removal of the nut meat, at which time the endplates are relatively rotated back to the normal position, thereby expanding the nut envelope. Nutcracker 10 may then be inverted to remove the cracked nut.

For example, should the aperture pattern of upper endplate 12 have a radii of 1.59 inches and the aperture pattern of lower endplate 14 have a radii of 0.62 inches, then the rod member center radii at a point midway between upper endplate 12 and lower endplate 14 would be 1.105 inches. Upon a relative rotation of the endplates of 30°, the midway radii between the rod members is reduced by ((radii 1.59−(1.59 * cosin 15°)))=0.054 inches)+((radii 0.62−(0.62 * cosin 15°))=0.021 inches) for a resulting midway radii reduction of 0.075 inches. Thus the midway radii of the rod members is reduced from 1.105 inches to 1.030 inches, providing an inward movement of 0.075 inches for each of the rod members. Because the aperture pattern radii at each of the endplates is constant, the closer nut 70 is to either endplate 12 or 14, the greater the leverage. A point equal to one-fourth of the nut envelope height would reduce the starting rod member center radii to 0.863 inches. A relative rotation of 30° would reduce the rod member center radii to 0.828 inches. Should the imaginary circumference of the endplates (across the corners) be 14.4 inches, then the torsion leverage at the midway point would be 8 to 1, with a leverage of 16 to 1 at one-fourth height.

The placement of nut 70 in the nutcracker 10 is not critical. A nutcracker having the preferred dimensional configuration results in the highly desirable result of cracking pecans with a high percentage of full halves. This is caused by the slow energy transfer to the shells being uneven due to the configuration of the nuts (not round) which requires less torque. As the shell becomes distorted outwardly in one direction, it becomes confined in that direction, highly stressing the shell with a minimum inward movement and with a large portion of the potential energy of the stress on the shell going into its cracking rather than the scattering of the shell fragments.

An important feature of the invention is the simple manufacturing and assembling technique enabled by the use of a compressible material for the rod members and endplates. Using precision manufacturing, the apertures are dimensioned slightly smaller than the outer end portions of the rod members, such that the ends of the rod members are press fittable into the apertures. Once fitted, the rod members are loosely retained by the apertures, and the nutcracker will not come disassembled unless substantially higher than normal force is applied to disengage the rod members from the endplates. Preferably, a wooden material is used for at least the rod members or the endplates, or both. Other suitable materials could include certain plastics or aluminum. As shown in FIG. 5, replaceable wear pin 90 of harder material may also be placed in the central portion of plate member 18 of lower endplate 14, to prevent damage to the lower endplate 14 when cracking relatively small sized native pecans.

Alternatively, as shown in FIGS. 6 and 7, resilient retaining elements may be used in lieu of or in addition to the press-fitted engagement of rod members 16 and endplates 12 and 14. As best shown in FIG. 6, resilient retaining washers 100 engage the outer end portions 46 of the end portions 42 interfitted with upper endplate 12. Washers 100 are sized such that their greatest dimensions are well in excess of the opening sizes of apertures 30. Specifically, each washer 100 is a ring-shaped member being approximately as tall in the axial direction as the thickness between the inner and outer cylindrical walls. In similar fashion, as shown in FIG. 7, a resilient harness member 102 is fitted over the outer end portions 46 of the end portions 42 interfitted with lower endplate 14. Harness member 102 has four apertures 104 in lobes 106 grouped about a central portion 108. Harness member 102 has flat upper and lower surfaces spaced equidistantly to form a harness member 102 of uniform thickness. In similar fashion washer members 100 have flat upper and lower surface equally spaced to form a uniformly thick washer member 100. Preferably, washer members 100 and harness member 102 are formed of a urethane plastic material of approximately 60 durometer. Washers 100 and harness 102 compensate for wear between the rod members 16 and endplates 12 and 14, such that as these relatively moving parts wear, the press-fitted engagement does not become compromised to the extent that the interfitted parts become disengaged. In other words, the resilient washers 100 and harness 102 serve to back-up the engagement maintained by the close tolerances between the apertures and rod member ends. Thus, utilization of the resilient washers 100 and harness 102 results in a nutcracker having a substantially longer duty cycle for "heavy-duty" nutcracking environments. Alternatively, it will be recognized that the provision of resilient retaining washers 100 and harness 102 could be utilized to eliminate the precision wood-working required to allow press-fittable interfitting of the rod members 16 and endplates 12 and 14. In such an embodiment, the resilient washers and harness members substitute for the precision wood-working rather than add to the interfitting capability thereof.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A nutcracker comprising:
   upper and lower endplates, each said endplate comprising a plate member having a central portion;
   said upper endplate plate member having an aperture-free central portion and a plurality of widely spaced apertures;
   said lower endplate plate member having a plurality of apertures closely spaced in said central portion thereof;
   a plurality of elongated rod members loosely interfitted at said ends thereof with said apertures in said upper and lower endplates to define a tapered nut envelope, said nut envelope being compressible by relative rotation of said upper and lower endplates; and
   adjacent ones of said rod members being spaced apart to receive nuts into said nut envelope at said ends thereof interfitted to said upper endplate, with said rod members being closely spaced at said ends thereof interfitted to said lower endplate, such that a nut admitted into said nut envelope between two adjacent ones of said rod members, drops by gravity into contact engagement with said rod members at a lower position, and cracking forces are applied to said nut by relatively rotating said upper and lower endplates.

2. The nutcracker of claim 1 wherein said plate members and rod members are formed from a compressible material, and said apertures are sized slightly smaller than said ends of said rod members, such that said ends are press fittable into said apertures.

3. The nutcracker of claim 2 wherein said compressible material is wood.

4. The nutcracker of claim 1 wherein said plate members are rectangular.

5. The nutcracker of claim 4 wherein said plate members are of substantially identical outer dimension.

6. The nutcracker of claim 1 wherein said plate members each have parallel planar inner and outer surfaces and four substantially planar side surfaces being of substantially equal length and being parallel on opposite sides and perpendicular on adjacent sides.

7. The nutcracker of claim 6 having four rod members.

8. The nutcracker of claim 7 wherein said apertures in said upper endplate are in close proximity to each of said four corners thereof.

9. The nutcracker of claim 1 wherein each rod member has a cylindrical main portion.

10. The nutcracker of claim 9 wherein each rod member has a tapered inner end portion.

11. The nutcracker of claim 10 wherein each rod member has an outer end portion of smaller outer dimension than said main portion and of larger diameter than said adjoining inner end portion.

12. The nutcracker of claim 11 wherein said outer end portions are sized slightly more largely than said apertures in said upper and lower endplates to be press forceable through said apertures but loosely retained by said apertures when interfitted with said inner end portions.

13. The nutcracker of claim 1 wherein adjacent rod members are spaced in the range of about 1.25 inches to about 1.75 inches at said ends interfitted with said upper endplate.

14. The nutcracker of claim 1 wherein adjacent rod members are spaced in the range of about 0.25 inch to about 0.5 inch at said ends interfitted with said lower plate.

15. The nutcracker of claim 1 wherein said rod members have a length of about 9 inches.

16. The nutcracker of claim 1 further comprising resilient retaining elements fitted to said ends of said rod members to maintain said interfitted relationship between said rod member ends and said upper and lower endplates.

17. A nutcracker, comprising:

upper and lower wooden endplates, each said endplate comprising a rectangular plate member of substantially identical outer dimension to said other endplate, said plate members each having parallel planar inner and outer surfaces and four substantially planar side surfaces of substantially equal length and being parallel on opposite sides and perpendicular on adjacent sides;

said upper endplate having an aperture-free central portion and four widely spaced apertures in close proximity to each of four corners thereof;

said lower endplate having four apertures closely placed in said central portion thereof;

four identical elongated wooden rod members defining a nut envelope, each said rod member having a cylindrical main portion, tapered inner end portions, and outer end portions of smaller outer dimension than said main portion and of larger diameter than said adjoining inner end portion, said outer end portions being sized slightly more largely than said apertures in said upper and lower endplates to be press forceable through said apertures but loosely retained by said apertures when interfitted with said inner end portions;

adjacent ones of said rod members being spaced in the range of about 1.25 inches to about 1.75 inches at said ends interfitted with said upper endplate and being spaced in the range of about 0.25 inch to about 0.5 inch at said ends interfitted with said lower plate, and said rod members having a length of about 9 inches, such that a nut admitted into said nut envelope between two adjacent ones of said rod members drops by gravity into contact engagement with said rod members at a lower position, and cracking forces are applied to said nut by relatively rotating said upper and lower endplates; and resilient urethane retaining washers being fitted to said tapered inner end portions of said rod members interfitted with said upper endplate, said washers having an outer dimension substantially exceeding the inner dimensions of said apertures in said upper endplate, and a resilient urethane retaining harness being fitted to said tapered inner end portions of said rod members interfitted with said lower endplate, said harness having an outer dimension substantially exceeding the inner dimensions of said apertures in said lower endplate.

* * * * *